United States Patent [19]

DeCesare

[11] 4,441,043

[45] Apr. 3, 1984

[54] COMPOUND INTERACTION/INDUCTION ELECTRIC ROTATING MACHINE

[76] Inventor: Dominic DeCesare, 223 Center St., Elizabeth, N.J. 07202

[21] Appl. No.: 209,646

[22] Filed: Nov. 24, 1980

[51] Int. Cl.³ .......................................... H02K 37/00
[52] U.S. Cl. ..................................... 310/46; 310/112; 310/181
[58] Field of Search ................ 310/46, 112, 181, 154, 310/42

[56] References Cited

U.S. PATENT DOCUMENTS

| | | | |
|---|---|---|---|
| 3,602,749 | 8/1971 | Esters | 310/154 |
| 3,912,955 | 10/1975 | Simpson | 310/216 X |
| 4,102,040 | 7/1978 | Rich | 310/216 X |
| 4,114,057 | 9/1978 | Esters | 310/46 |
| 4,233,532 | 11/1980 | Esters | 310/46 |

*Primary Examiner*—Donovan F. Duggan
*Attorney, Agent, or Firm*—Lilling & Greenspan

[57] ABSTRACT

A dynamoelectric machine of the type having a distributed armature winding in a cylindrical rotor wound to form axial and substantially radial winding portions and including permanent and/or electromagnets to form radial and axial air gaps between the rotor and the stator, and to provide interaction between the magnetic field in the radial air gap and the axial rotor winding portions and to provide interaction between the magnetic fields in the axial air gaps and the essentially radially rotor winding portions.

32 Claims, 19 Drawing Figures

COMPOUND INTERACTION/INDUCTION ELECTRIC ROTATING MACHINE

BACKGROUND OF THE INVENTION

1. Field of the Invention

The present invention generally relates to dynamoelectric machines capable of operating in a generator mode or in a motor mode and, more specifically, to a compound interaction/induction dynamoelectric machine of the type having a distributed armature winding on a cylindrical rotor.

2. Description of the Prior Art

Most armatures have distributed windings i.e., windings which are spread over a number of slots around the periphery of a rotor or armature of the machine. In most conventional designs the machines are of a radial magnetic gap type so that electrical currents applied to the windings of the rotor or stator, or to the windings of both, generates electromagnetic fields in the rotor or in the stator, as the case may be. The torque or the EMF induced in the machine results from the interaction between the magnetic field in the radial magnetic gap and the generally parallel axial winding portions of the armature coils disposed in the axial grooves or slots of the armature. However, the back and front connections which are those portions of the windings which connect substantially diametrically opposing axial wire portions situated in the grooves have not been utilized in order to enhance the efficiency of the machine. Such front and back connections, which are substantially normal to the axis of the machine, rotate with the armature but have not been used to increase the torque of the machine, in the case of a motor, or to increase the power output, in the case of a generator. Specially designed special purpose dynamoelectric machines have been proposed in order to increase the efficiency and power output for given weight and size of the machine. One approach has been to use axial air gap type machines such as the brushless axial air gap inductor-type dynamoelectric machine disclosed in U.S. Pat. No. 3,467,844. The machine disclosed in the aforementioned patent uses plural variable reluctance rotors and a toroidal coil stator therebetween. However, the machine does not make use of a radial air gap. Accordingly, the machine requires a special construction which does not make use of conventional distributed armature-type windings.

In an effort to provide electric machines which are inexpensive and small in size, there has also been developed disc-type rotors in machines defining axial air gaps. One example of such a machine is disclosed in U.S. Pat. No. 3,558,947. In that patent, a D.C. motor is described which includes a disc armature and a permanent magnet stator providing an axial air gap. Such machines, which use axial air gaps and generally flat armatures are sometimes referred to as having a pancake coil. Such pancake coils or rotors contain all of the armature turns in a generally flat plane which is normal to the shaft or axis of the machine. There is, accordingly, no axial air gap as there is in conventional cylindrical rotor distributed armature winding machines. In some instances, instead of making use of a winding on a pancake-type rotor, a flat substrate is provided on which various winding patterns are printed. Such winding patterns may be etched, plated, printed or pressure bonded on such thin disc armature of insulating material. However, because of the difficulties which have been experienced with such thin disc-armatures, primarily because of the flexibility of the discs on which the conductors are placed, an electric machine has been disclosed in U.S. Pat. No. 3,487,246 which applies such conductive pattern on a conical surface of an insulating member. The purpose of making the armature conical is to provide a more rigid structure than the flat disc armature structures. Such flat substrate armature machines, however, whether flat or conical, cannot provide the mechanical or electrical power output as is possible with conventional cylindrical rotor machines.

U.S. Pat. No. 4,143,288 discloses a coreless motor which includes a rotor having a plurality of coils constituting a pancake coil. The motor disclosed in this patent is a special purpose motor which is capable of being attached to electrical parts such as balance weights, servo-mechanisms, etc. However, this motor likewise lacks the conventional cylindrical rotor found in most dynamoelectric machines which is provided with a distributed armature winding. As with the other pancake-type armatures, the coreless motor disclosed in this patent does not have a radial air gap and, therefore, does not have the ability to compound the interaction or induction in the machine both at the axial ends and the peripheral surface of the armature.

There has also been proposed a dynamoelectric machine which has plural stators. Such machines have been disclosed in U.S. Pat. Nos. 3,396,296; 3,426,224; 3,602,749; 3,729,642 and 4,114,057. These patents, all issued to the same patentee, were intended to combine the advantages of using both the radial gap and axial gap in dynamoelectric machines. However, to do so, applicant disclosed a complicated structure making use of both inner and outer stators and a hollow cylindrical rotor. In these structures, a first stator is disclosed within the hollow cylindrical rotor and a second stator, also cylindrical in shape, is disposed such as to surround the rotor. In this way, double radial air gaps are formed. It was also suggested that end stators be used to form axial air gaps between the ends of the rotor and the magnetic field created by the end stators. These machines were described as having greater efficiency than conventional motors or generators as the result of the increased interaction between the multitude of magnetic field and electromagnetic fields. However, the machines proposed in the last mentioned series of patents are unconventional in design and construction, do not have radial grooves and do not have front and back armature winding connections at the axial ends of the rotor as is present in the normal distributed armature winding arrangements. Instead, the windings are each wound around a flat, relatively thin magnetic core.

Other special purpose dynamoelectric machines have been proposed for special applications. Thus, for example, in U.S. Pat. No. 4,051,401, a spherical air gap motor is disclosed wherein the magnetic ring closing the stator magnetic loop has a non-cynlidrical shape. Such electric motors with spherical air gaps have found applications in pump drives, particularly for hermetically sealed chemical pumps.

The prior art has not, however, heretofore utilized both radial and axial air gaps in cylindrical rotor machines having distributed armature windings. By harnessing the additional torque, in the case of motor operation, or the additional electromagnetic force, in the case of generator operation, significant improvements in efficiency can be obtained without compromising any constructional features and without the need to resort to unconventional, complicated or costly machine designs.

SUMMARY OF THE INVENTION

Accordingly, it is an object of the present invention to provide a dynamoelectric machine which is not possessed of the disadvantages associated with the aforementioned prior art machines.

It is another object of the present invention to provide a dynamoelectric machine which is simple in construction and economical to manufacture.

It is still another object of the present invention to provide a dynamoelectric machine of the type having a cylindrical rotor with conventional distributed armature windings, and which makes use of both radial and axial air gaps to provide compound interaction/induction between the armature and the multiple stators.

It is yet another object of the present invention to provide a dynamoelectric machine of the type suggested in the last object which has significantly higher efficiency than the prior art comparable machines to thereby provide substantial improvements in output torque, in the case of motor operation, and significant increases in electrical output power, in the case of generator operation.

It is a further object of the present invention to provide the features and advantages suggested in the aforementioned objects both in A.C. or D.C. dynamoelectric machines.

In order to achieve the above objects, as well as others which will become apparent hereafter, a dynamoelectric machine in accordance with the present invention comprises a frame, and a rotatable shaft supported by said frame. A cylindrical rotor is mounted coaxially on said shaft, said cylindrical rotor defining two axial end surfaces each substantially in a plane normal to said shaft and a cylindrical circumferential surface coaxial with such shaft between said axial end surfaces. Said rotor is provided with a plurality of rotor coil winding-receiving grooves which are generally parallel to said shaft and substantially uniformly spaced from each other about said circumferential surface.

A distributed armature winding is provided which has axial portions parallel to said shaft and received within said rotor grooves radial portions in the region of said end surfaces and extending between substantially diametrically opposite grooves with respect to said shaft. Magnetic field producing means is provided mounted on said frame for producing a first magnetic field directed to interact with said winding axial portions and second magnetic fields, in the region of each axial end surface of said rotor, which are directed to interract with the respective winding radial portions.

An important feature of the present invention is to minimize the radial and axial air gaps or the distances between the rotors and the radial and axial portions of the armature windings. In order to achieve such optimization in coupling between the magnetic fields and the armature windings, said magnetic field producing means is advantageously configurated to generally conform to the circumferential and conical convex surfaces to compensate for the build-up of radial winding portions at each rotor or armature end surface. Alternately, where the magnetic field producing means is not configurated to conform to the rotor winding build-up at the axial ends of the rotor, projections may be provided extending axially from said end surfaces of said rotor. Such axial projections are configurated to extend beyond the axially outermost points of the winding build-ups and form protective slots for the winding radial portions and form a substantially flat surface at each axial end of the rotor.

BRIEF DESCRIPTION OF THE DRAWINGS

The objects and advantages of the present invention will become apparent to those skilled in the art when the following description of several illustrative embodiments of the invention is read in conjunction with the accompanying drawings, in which.

DESCRIPTION OF THE PREFERRED EMBODIMENTS

Figures 1, 2, 3:
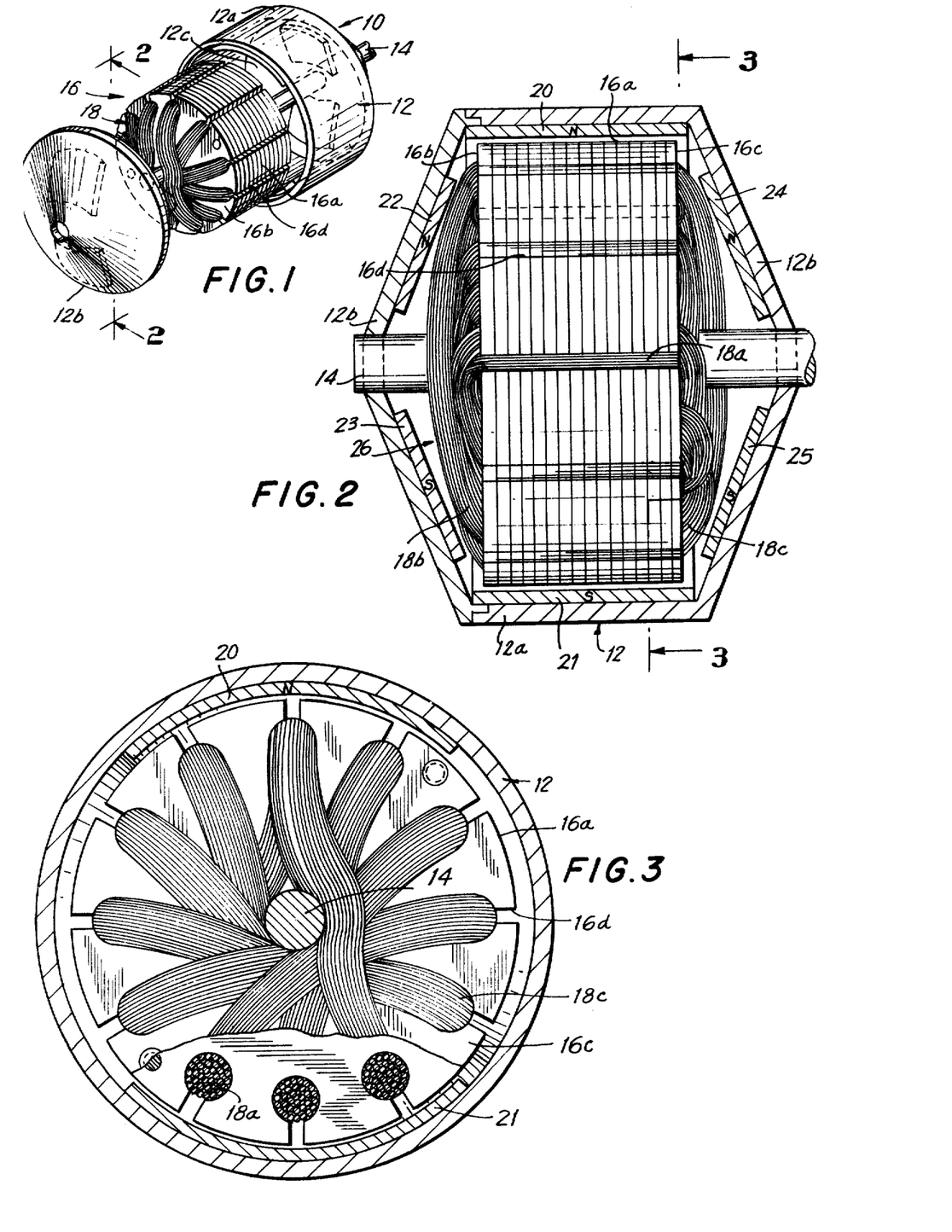
FIG. 1 is a perspective, partially exploded view of a dynamoelectric machine in accordance with the present invention.
FIG. 2 is an enlarged cross-sectional view of the assembled machine shown in FIG. 1, taken along line 2—2.
FIG. 3 is a cross-sectional view of the machine shown in FIG. 2, taken along line 3—3.

Referring now more specifically to the figures, in which identical or similar parts are designated by the same reference numerals throughout, and first referring to FIGS. 1-3, there is shown a first presently preferred embodiment which utilizes permanent magnets in the stators.

The permanent magnet embodiment of the dynamoelectric machine in accordance with the present invention is generally designated by the reference numeral 10. The machine 10 includes a generally cylindrical frame 12 of the type normally used in conventional cylindrical rotor dynamoelectric machines having distributed armature windings.

A shaft 14 is provided which is rotatably mounted on the frame 12 by conventional means, such as suitable bearings (not shown).

A cylindrical rotor or armature generally indicated by the reference numeral 16 is mounted coaxially on the shaft 14. The cylindrical rotor 16 defines a cylindrical circumferential surface 16a coaxial with the shaft, and two axial end surfaces 16b and 16c each substantially in a plane normal to the shaft 14 and disposed at each axial end of the cylindrical circumferential surface 16a. The rotor or armature 16 is provided with a plurality of rotor coil winding-receiving grooves or slots 16d which are generally parallel to the shaft 14 and substantially uniformly spaced from each other about the circumferential surface 16a.

A distributed armature winding generally indicated by the reference numeral 18 is provided on the rotor or armature 16 in a conventional manner and having axial portions 18a which are parallel to the shaft 4 and received within the rotor grooves or slots 16d. The distributed armature winding also defines radial portions 18b in the region of the end surfaces 16b and 16c which extend between substantially diametrically opposite grooves 16d with respect to the shaft 14. The radial portions 18b are sometimes referred to as front winding connecting portions, while the radial portions 18c are sometimes referred to as back winding connecting portions.

What has been described up to this point is a dynamoelectric machine, either a motor or generator, which is conventional in construction.

In order to better appreciate the present invention, a brief description of conventional dynamoelectric machines will now be given in relation to the structure which has been described up to this point. According to the present state of the art, the magnetic influence of the magnetic field established by a stator magnetic circuit construction interacts primarily with the perimeter or peripheral surface 16a of the armature in order to create torque or the force which produces rotation. Typically, the field assembly stators are constructed with diametrically opposite north and south magnetic pole surfaces conforming to the armature perimeter or peripheral surface and interacts only with the axial winding portions 18a which lie in the peripheral grooves or slots 16d. Such a conventional approach has been taken notwithstanding the fact that the front connecting or radial portions 18b and the back connecting or radial portions 18c have necessarily existed in all rotor or armature windings substantially as suggested in the figures. Yet, there has not been any attempt to take advantage of these additional winding portions, at each axial surface of the rotor or armature, in order to enhance the efficiency of the machine.

Generally, the present invention has for its primary object to construct field assembly stators which interact with the armature coils not only along the periphery or circumferential surface of the armature or rotor, but also along both axial sides of the armature. While the descriptions of various preferred embodiments that follow disclose stator constructions which incorporate both permanent magnet, electromagnetic, or combinations of both, all constructions achieve the beneficial result that additional stator magnetic fields are produced and arranged to interact with the hitherto neglected front and back connecting portions 18b and 18c as will be more fully described hereafter.

Additionally, all armatures 16 are shown to be 12-coil assemblies. However, this is only for illustrative purposes, and, as will be more fully evident from the disclosure that follows, any armature coil assembly can be used while still achieving the objects of the present invention. The associated 12-segment commutator assembly, which will be used with the 12-coil windings shown, would normally be common to all embodiments. However, the commutator assembly has been omitted from the illustrations in the interest of expediency and clarity since they are fully conventional. Motor housings, insulation and terminal wiring arrangements have likewise been excluded for the same reason. Where shown, the letters "N" and "S" denote north and south poles respectively and are included for purposes of illustration only. Clearly, the poles can be reversed in most instances without any adverse effects on the operation or efficiency of the machines.

Accordingly, with each of the embodiments to be described, there is provided magnetic field producing means mounted on the frame 12 for producing a first magnetic field which bridges the radial air gap between the frame 12 and the cylindrical circumferential surface 16a which is directed to interact with the winding axial portions 18a, and second magnetic fields, in the region of each axial end surface 16b, 16c of the rotor or armature 16, which are directed to interact with the respective winding connection or radial portions 18b 18c.

Referring again to FIGS. 1-3, the stator magnetic circuit is shown to comprise a series of permanent magnets having the relative polarities as shown. Thus, there is provided diametrically opposed permanent magnets 20 and 21, of opposite polarities. The magnetic field created between the permanent magnets 20 and 21 bridges the radial air gap and interacts with the axial winding portions 18a of the armature winding.

The frame 12, as shown particularly in FIGS. 1 and 2, also includes stator end portions, covers or plates 12b which close the respective openings formed at each axial end of the cylindrical portion 12a of the frame 12. While one of the covers or plates 12b may be integrally formed with the cylindrical frame portion 12a, the other cover 12b must, of course, be necessarily removable to allow insertion of the rotor or armature 16 into the frame 12.

Mounted on one frame end cover 12b, on diametrically opposite sides of the shaft 14, are permanent magnets 22 and 23 of opposite polarity as shown. Similarly, permanent magnets 24 and 25, also of opposite polarity, are disposed on diametrically opposite sides of the shaft 14 on the other of the end frame covers 12b. As should be evident, providing permanent magnets of opposite polarities on diametrically opposite sides of the shaft 14 on each of the frame covers 12b creates a magnetic field which couples to the front and back connection or radial portions 18b and 18c to thereby interact therewith. The machine allows for a significant improvement in efficiency over the conventional perimeter-only stator embodiments. Since the embodiment of FIGS. 1-3, as well as the other embodiments to be described hereafter, permits interaction with a previously untapped energy field, i.e. the axial sides of the armature coils, the machine, when operation in a motor mode, will function to produce a given amount of torque at the shaft utilizing only a small fraction of the normally required current or input electrical power. Stated otherwise, for the same amount of input electrical power, a machine operating as a motor and incorporating the subject invention will produce significantly more output torque at the shaft 14. Corresponding efficiencies would, of course, result if the machine were to be used in a generator mode.

In order to take full advantage of this additional source of interaction between the armature or rotor and the stator fields, and, therefore, to optimize upon the efficiency which may be obtained thereby, the configuration of the stator field is modified, where appropriate, to enhance coupling between the stator field and the connection or radial portions 18b, 18c of the armature winding. Thus, it will be noted that the winding radial portions 18b and 18c at each axial end surface 16b, 16c of the rotor 16 create a build-up of overlapping windings which is minimum at the circumferential surface 16a and gradually increases to a maximum in the region of the shaft 14. This build-up, which is generally designated, for example, in FIG. 2 by the reference 26, defines a generally conical convex surface. In order to minimize the air gap between the winding radial portions and the permanent magnets 22-25, and therefore enhance the coupling between the stator field in those regions with the side or connection windings, the frame end covers 12b are configurated to generally conform to the conical convex surfaces. Of course, as suggested previously, the same is true for the radially spaced magnets 20 and 21 disposed on the cylindrical portion 12a of the frame. By minimizing the air gaps between the permanent magnets and the associated armature winding portions, coupling between the associated fields are optimized and magnetic interaction, whether it is to produce a torque or to generate an induced EMF, is enhanced. In the embodiment of FIGS. 1-3, the end covers 12b are each shown to define a generally concave surface which conforms to each conical convex surface defined by the radial winding portions. Therefore, in the embodiment being described, the first stator field is produced by the permanent magnets 20 and 21 while the second magnetic fields, which are produced as the result of the use of the constructions in accordance with the present invention, are created by the permanent magnets 22 and 23, at one axial end, and the permanent magnets 24 and 25, at the other axial end.

It has been found that the inclusion of the additional permanent magnets 22-25 can more than double the torque output from the machine without an increase in the current requirement for the armature coils. Additionally, a much greater EMF could be induced thereby. The magnitudes of the aforementioned improvements results are equally applicable to all of the electromagnetic configurations which will be described below.

It should also be pointed out with respect to the enbodiment of FIGS. 1-3 that while all the stator fields in this embodiment are produced by permanent magnets, the same or similar results can be obtained where at least one of these permanent magnets is replaced by an appropriate electromagnet which displays or exhibits the same polarities. Therefore, in the embodiment of FIGS. 1-3, at least one of the permanent magnets shown can be replaced by an electromagnet, so that either all of the stator field producing means will either be permanent magnets, electromagnets, or combinations thereof.

Figures 4, 5:
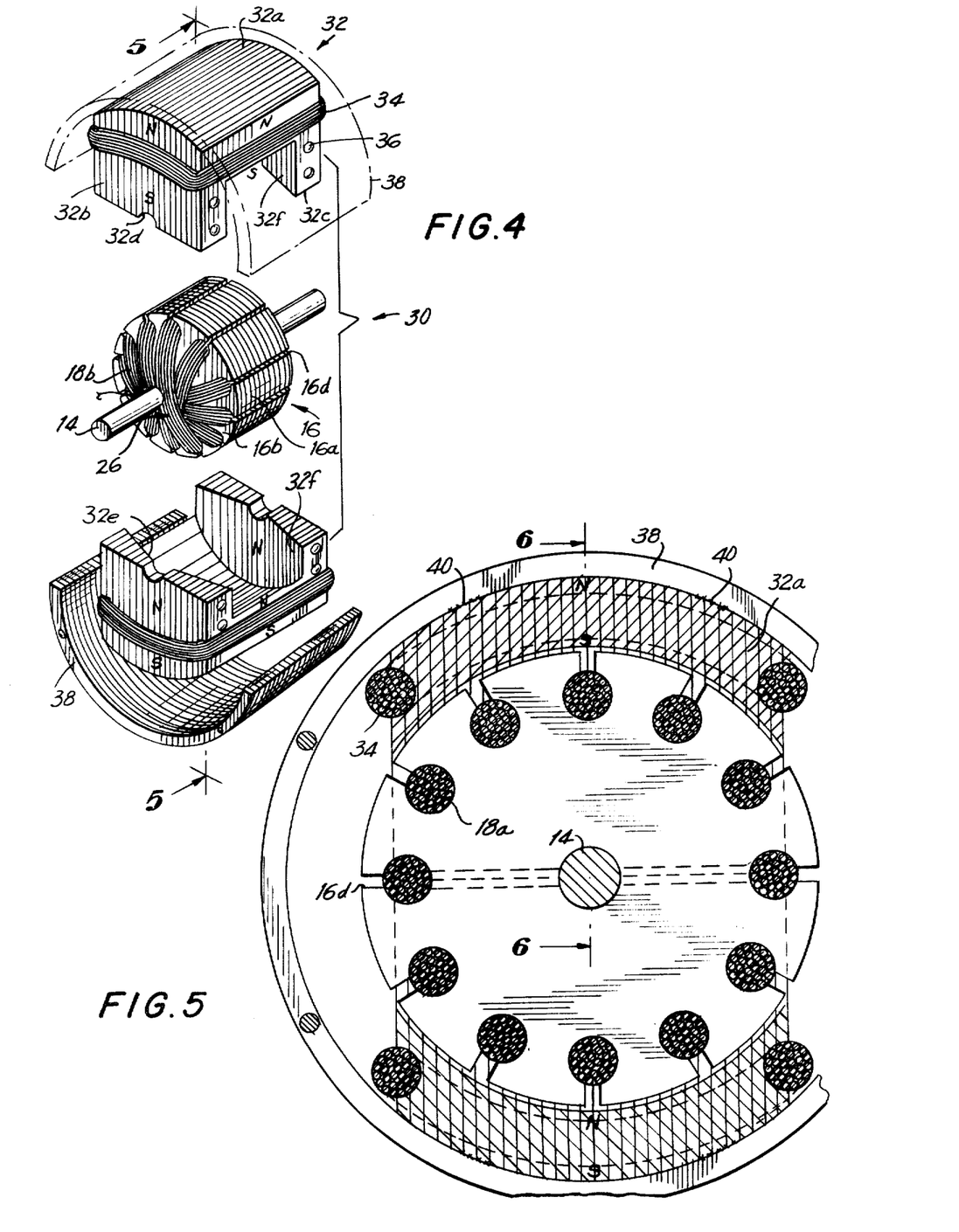
FIG. 4 is an exploded view, in perspective, of another embodiment of a dynamoelectric machine in accordance with the present invention.
FIG. 5 is an enlarged cross-sectional view of the assembled machine shown in FIG. 4, taken along lines 5—5.
Figures 6, 7, 8, 9:
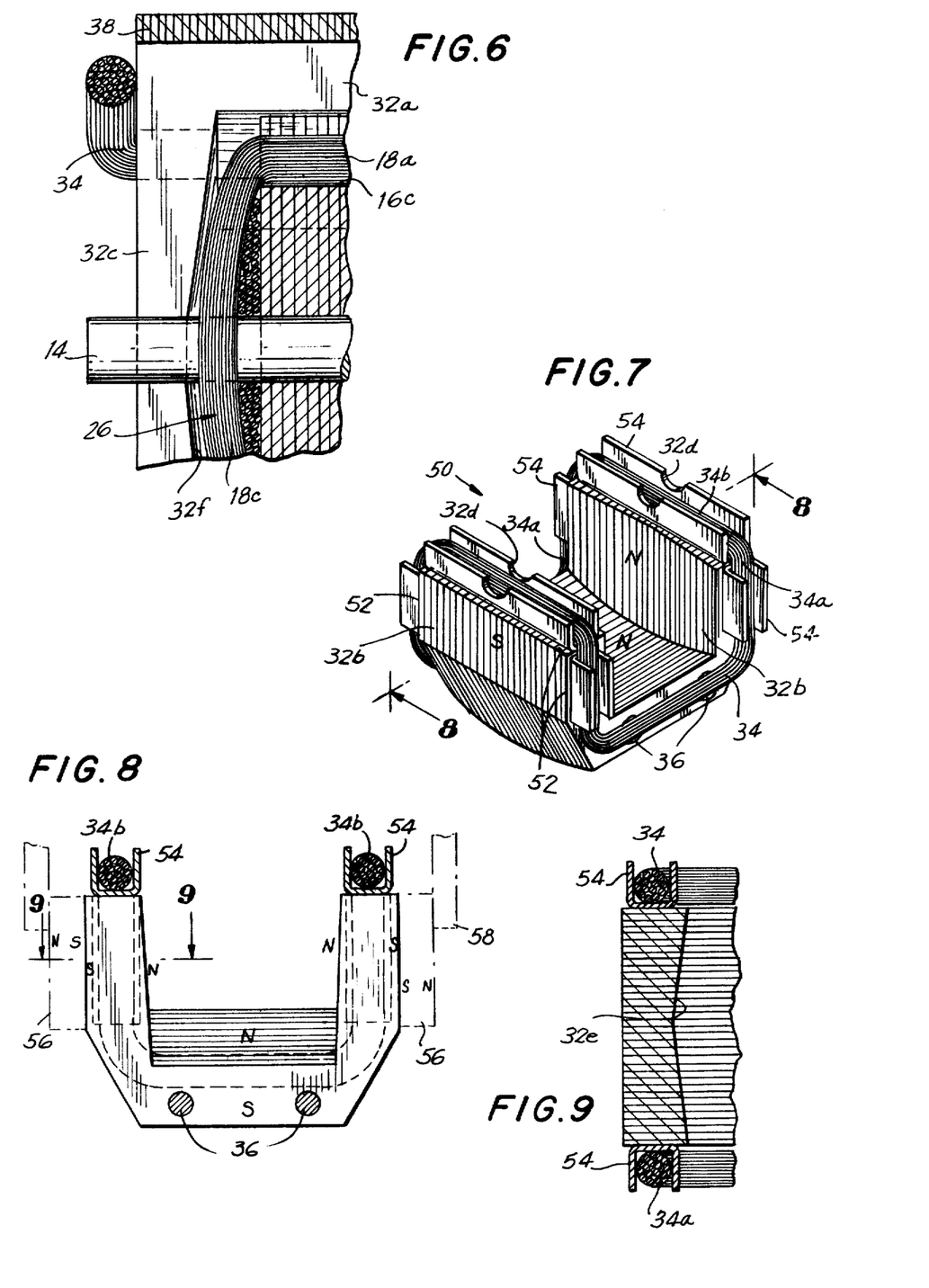
FIG. 6 is a partial cross-sectional view of the machine shown in FIG. 5, taken along line 6—6.
FIG. 7 is a perspective view of half of a stator constructed in accordance with still another embodiment of the present invention.
FIG. 8 is a cross-sectional view of the stator shown in FIG. 7, taken along line 8—8.
FIG. 9 is a partial cross-sectional view of the stator shown in FIG. 8, taken along line 9—9.

Referring to FIGS. 4-6, there is shown another presently preferred embodiment of the present invention which is in the nature of a single stator embodiment designed to use only two coils in the stator creating only one north and one south pole. The second embodiment is generally designated by the reference numeral 30. The armature 16 is identical to the one previously described in connection with the first embodiment of FIGS. 1-3. Here, however, the magnetic field producing means includes two opposing generally U-shaped magnetic cup members 32 disposed in diametrically opposite sides of the rotor 16 to substantially surround the same. Each cup member 32 has a longitudinal portion 32a generally conforming to the shape of the rotor circumferential portion 16a and transverse portions 32b and 32c, respectively, at each end of the longitudinal portion 32a. Each transverse portion 32b, 32c extends from the associated longitudinal portion 32a to the region of the shaft 14, the corresponding transverse portions on the opposing cup members forming air gaps therebetween proximate to the winding axial or connection portions 18b, 18c. A stator winding 34 is provided which extends about each cup member 32 and disposed between the radially outermost and innermost surfaces thereof as shown. Advantageously, each cup member winding 34 extends about a respective longitudinal portion 32a and is generally parallel to the shaft 14.

Circular recesses 32d are provided in each transverse portion as shown dimensioned to receive the shaft 14 while establishing an air gap between opposing transverse portions on each side of the shaft.

The relative polarities of the U-shaped magnetic cup members are shown in FIGS. 4 and 5. As will be clear, there will be a magnetic field created across the air gap at each pair of opposing poles at diametrically opposite sides of the shaft, that magnetic field being in a position to couple, again, to the connection or radial portions 18b, 18c of the armature winding. Again, therefore, coupling with such hitherto unused armature winding portions is provided to thereby enhance the overall efficiency and operation of the machine.

As with the first described embodiment, the cup members 32 are advantageously provided with surfaces 32e and 32f which are somewhat conical in shape and which conform as closely as practical with the generally convex surface of the build-up 26 at each axial end of the armature. As previously suggested, such conformance of the stator magnetic producing field elements minimize the air gaps in the axial or end regions, optimize coupling and, therefore, optimize interaction and output.

Because the embodiment shown in FIGS. 4-6 provides the U-shaped magnetic cup members 32 which completely surround the armature to interact with the armature coils on all surfaces as described, the embodiment is considered to be preferred since it will provide the most torque power proportionate to its current requirements. In this design, the primary interaction thrust for motor action (or inductive thrust for generator action) occurs at the perimeter portions of the armature coils, which are parallel to the stator coils, as with conventional machines. However, secondary thrust or inductive efficiency occurs at the axial side portions of the armature coils. Both actions are simultaneous and combine to apply greater magnetic force to the armature coils for either motor or generator action, as applicable.

Still referring to FIGS. 4–6, the cup members 32 are shown to be formed of stacked laminations disposed in planes parallel to the shaft 14 and held together, for example, with rivets 36. However, any other conventional means for connecting the stacked laminations may be used.

In order to optimize the magnetic fields at the axial air gaps formed between adjacent and opposing transverse portions 32b, there is advantageously provided a cylindrical yoke 38 which is coaxial with the shaft 14 and encloses the cup members 32 while magnetically connecting the radially outermost surfaces of the longitudinal portions 32a of the cup members 32. As is best seen in FIG. 5, the use of such magnetic yoke 38, by magnetically shorting the outermost poles, which do not enter into the production of useful magnetic flux, reduces the reluctance of the magnetic circuit in such a way as to enhance or increase the magnetic flux available in the various air gaps, including the radial air gaps between the longitudinal portion 32a and the cylindrical circumferential surface 16a of the rotor, as well as in the axial air gaps produced in the regions of the shaft proximate to the connection or radial winding portions 18b, 18c of the armature. In a practical embodiment, the yoke 38 may be joined or connected to the U-shaped magnetic cup members in any conventional manner such as, for example, spot welds 40 which are suggested in FIG. 5.

While the cup members shown in FIGS. 4–6 are formed of stacked laminations disposed in planes parallel to the shaft, the yoke 38 is, for practical reasons, shown being formed of stacked laminations disposed in planes normal to the shaft 14.

A modified version of the embodiment shown in FIGS. 4–6 is shown in FIGS. 7–10 and the stator of this modified embodiment is generally identified by the reference numeral 50. Here, the windings 34 extend along the outer peripheral surfaces 52 of the transverse portions 32b in a plane normal to the shaft 14, in addition to extending along the longitudinal portion as with the embodiment shown in FIGS. 4–6. In order to maintain the winding 34 in the configuration shown and in association with the magnetic cup member, there are advantageously provided winding retainers 54 which are in the nature of channels having a U-shaped cross-sectional configuration. The middle retainer on each transverse portion 32b is provided with a cut-out 32d for receiving the shaft as previously described.

Figure 10:
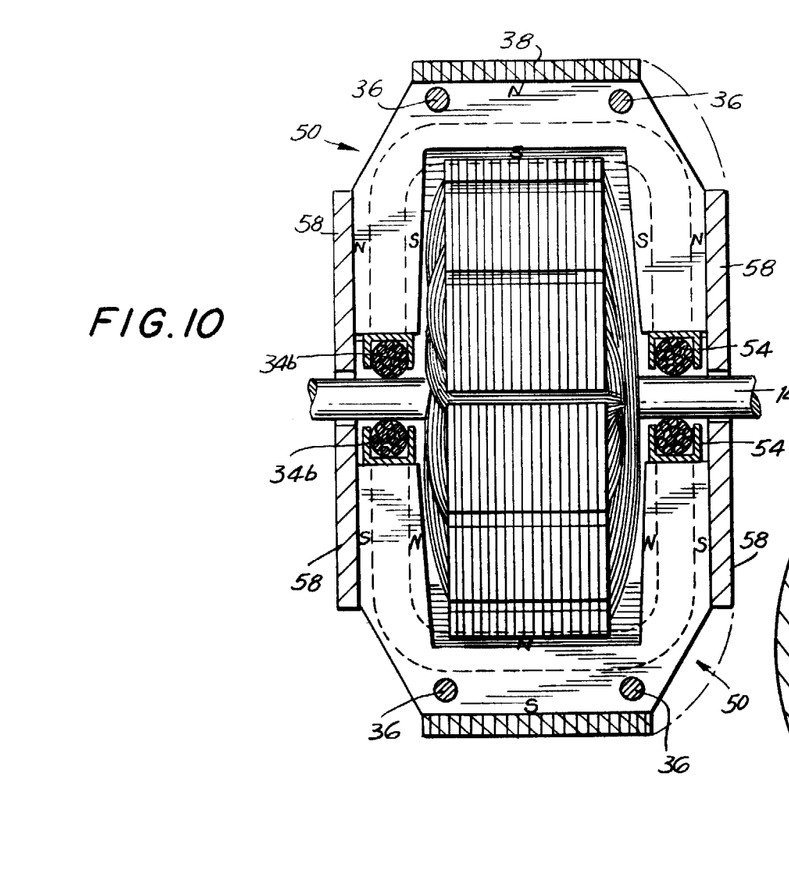
FIG. 10 is a cross-sectional view of a dynamoelectric machine fully assembled and making use of stators of the type shown in FIGS. 7-9.

Referring to FIG. 10, there is shown an electrodynamic machine incorporating two yokes 50 of the type shown in FIGS. 7 and 8, and the relative polarities of the U-shaped magnetic cup members when currents are caused to flow in the windings 34. In order to optimize the useful flux in the machine, yokes 58 are advantageously used, at each axial end of the machine to magnetically connect the axially outermost surfaces of the transverse portions, in addition to the cylindrical yoke 38 which is coaxial with the shaft 14 and encloses the cup members while magnetically connecting the radially outermost surfaces of the longitudinal portions as described in connection with FIGS. 4 and 5. While the magnetic yokes 38 and 58 are advantageously used simultaneously as shown in FIG. 10, it is possible to eliminate one of these yokes with attendant decreases in improved results.

While the cup members shown in FIGS. 7–10 and yokes 58 are formed of laminations disposed in planes parallel to the shaft 14, the laminations of the yoke 38 are, as previously suggested, concentric with the axis of the shaft 14.

It is possible, in connection with the stators 50 of FIGS. 7–10 to enhance the useful magnetic flux in the radial as well as axial air gaps by adding permanent magnets and, thereby, effectively form compound magnets. Referring to FIG. 8, there is shown, by way of example only, the addition of permanent magnets 56 having relative polarities as shown, these enhancing the useful stator magnetic fields by compounding the fields created by the electromagnets formed by the use of the windings 34. Such permanent magnets 56, therefore, are arranged on the axially outermost surfaces of the transverse portions 32b and are arranged to enhance the second magnetic fields which couple with the connection or radial portions 18b and 18c of the armature.

As with the previously discussed embodiments, the internal surfaces of the stators 50 which face or are disposed proximate to the armature are configurated to minimize the air gaps therebetween and therefore optimize magnetic coupling. The conforming of the shape of the stator to the convex shape of the armature windings is illustrated in FIG. 9, wherein the internal surface 32e is in the nature of a conical concave surface which is configurated to complement the external or convex shape of the armature end windings 18b, 18c.

Figures 11, 12, 13:
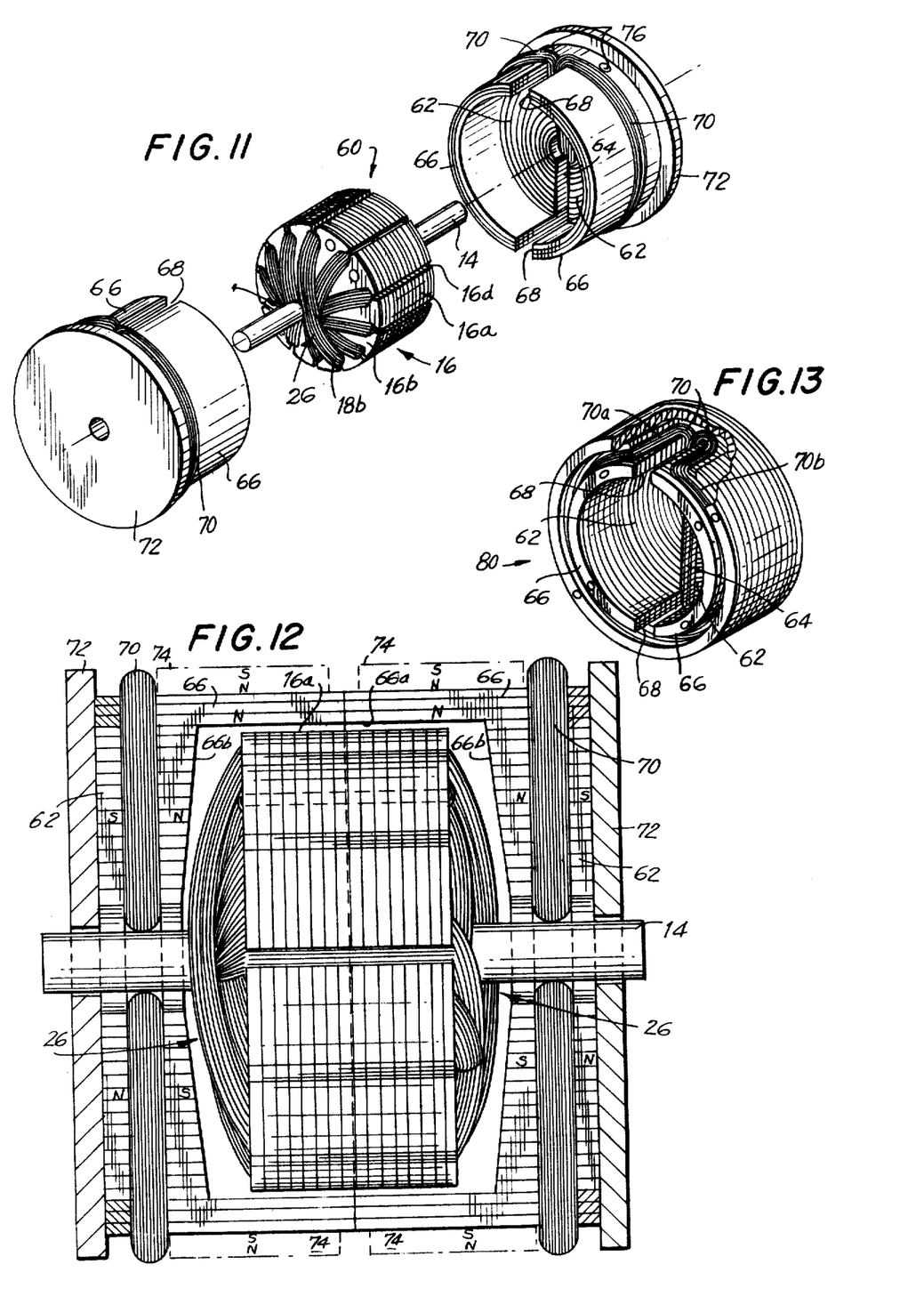
FIG. 11 is an exploded view, in perspective, of yet another emdodiment of the present invention.
FIG. 12 is an enlarged cross-sectional view of an assembled machine of the type shown in FIG. 11.
FIG. 13 illustrates, in perspective, a stator in accordance with a still further embodiment of the present invention, wherein the stators are a modification of the stators illustrated in FIGS. 11 and 12.

Referring to FIGS. 11 and 12, there is shown a further embodiment of the present invention which is generally designated by the reference numeral 60. As before, the rotor or armature is substantially the same as previously described. In this embodiment, however, the stator magnetic field producing means includes two members which may be semi-circular magnetic sectors 62 at each axial end of the rotor 16, arranged to form a diametrical air gap 64 proximate to the winding radial portions 18b, 18c. Each sector 62 has associated therewith a semi-cylindrical projection 66 dimensioned to cover in close proximity a portion of the rotor circumferential surface 16a. The semi-cylindrical projections 66 on associated sectors 62 also form longitudinal air gaps 68 which are parallel to the shaft 14 and proximate to the winding axial portions 18a. A winding 70 is provided which extends about the peripheries of the sectors 62 in a plane substantially normal to the shaft 14. In this manner, the windings 70 create a field at the diametrical air gaps 64 suitable for coupling to the radial winding or connection portions 18b, 18c and at the longitudinal air gaps 68 for coupling to the axial winding portions 18a.

The relative polarities for an illustrative arrangement and directions of winding currents are illustrated in FIG. 12. In order to enhance the useful magnetic stator flux, there are advantageously provided yokes, such as 72 which are in the nature of a circular disc magnetically connecting the axially outermost surfaces of the magnetic sectors 62.

While the sectors 62 are shown formed of concentric laminations coaxial with the shaft 14 and slotted to provide the diametrical air gaps 64, the sector 62 may also be formed of a continuous spiral lamination slotted to provide the diametrical air gaps. The concentric and spiral lamination approaches each have their own advantages and disadvantages insofar as connection, manufacturing economies, etc., and one may prove to be more advantageous than the other in a given application.

Compounding of magnets is also possible with the embodiment shown in FIGS. 11 and 12. By way of example, permanent magnets 74 are shown arranged on the radially outermost surfaces of the semi-cylindrical projections 66 to enhance the useful stator magnetic fields. Whether the additional permanent magnets 74 are used or not, it is advantageous to make use of the yoke 72 which, as described, is in the nature of a circular disc magnetically connecting the axially outermost surfaces of the magnetic sectors 62. However, because of the relative polarities of the magnets, it is not useful to make use of a cylindrical type yoke of the type described in connection with, for example, FIGS. 4 and 10, and which were identified by the reference numeral 38.

Figure 14:
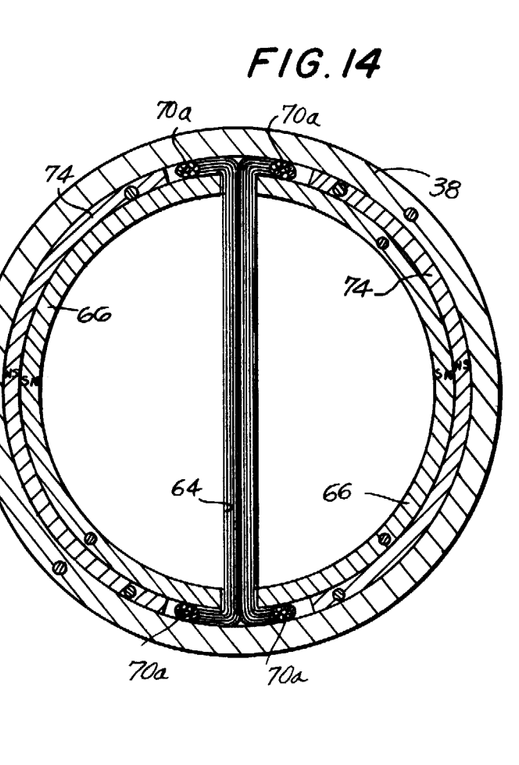
FIG. 14 is an enlarged cross-sectional view of the stator shown in FIG. 13, taken at a cutting plane which is normal to the axis of the stator.

A modified version of the electrodynamic machine shown in FIGS. 11 and 12 is illustrated in FIGS. 13 and 14. Here, as with the embodiment shown, for example, in FIG. 7, the modified embodiment, which is generally designated by the reference numeral 80, provides for each winding 70 to extend about a sector 62 and also extend along the periphery of the radially outer surface of an associated extension 66 as shown in FIG. 13. The windings 70 in FIG. 13, therefore, include portions extending along the diametrical air gaps 64 as best shown in FIG. 14, axial portions 70a extending along the outer surface of an associated extension 66 in a direction parallel to the shaft 14, and a circumferential winding portion 70b which extends along the circumferential outer surface of an associated extension 66 in a plane substantially perpendicular to the shaft 14. With this modified embodiment 80, as best shown in FIG. 14, there is advantageously provided a cylindrical yoke 38 coaxial with the shaft 14 and magnetically connected with the radially outermost surfaces of the semi-cylindrical projections 66.

In accordance with another feature of the embodiment shown in FIGS. 13 and 14, the yoke which is in the nature of the circular disc 72 may be magnetically connected to the axially outermost surfaces of the magnetic sector 62, so that where the cylindrical yoke 3 is used, the circular disc and cylindrical yokes are joined together to form a continuous yoke which encloses the respective set of sectors and associated projections.

The embodiments described above and shown in FIGS. 11–14, 16 and 18 can be described as having dual disc stators designed to use a total of 4 stator coils, each set of stator poles being created by two coils. As with the other embodiments previously described, each stator disc surrounds the armature 16 and permits interaction with the armature coils at all surface portions thereof, including the circumferential and end surfaces. These designs provide greater torque power than the single stator embodiment illustrated in FIGS. 4–10. In the embodiments of FIGS. 11–14, 17 and 18, the intersection between the stator fields and the armature windings, whether it be to create a thrust or torque or induce a voltage in these windings, are reversed. The main thrust occurs at the axial side portion of the armature coils parallel to the stator poles while the secondary thrust or inductive interaction is at the perimeter pole extensions parallel to the perimeter portion of the armature coils. Again, both actions are simultaneous and combine to apply greater magnetic force on the armature coils for motor or generator action, as applicable.

Still referring to FIGS. 11–14, 17 and 18, and particularly FIG. 12, it should be pointed out that when slots or diametrical air gaps 64 are formed within the concentric or spiral laminations forming the semi-circular sector 62, the axially outer portions of the sectors 62, between the windings 70 and the disc yokes 72 also comprises, for all practical purposes, a yoke for linkage of both poles. Accordingly, the disc yokes 72 are, in effect, supplemental yokes which assist in linking the poles, for example the south poles at the top of FIG. 12 and the north poles at the bottom of FIG. 12.

As with the other embodiments, concave inner surfaces 62b and 66b are provided for the same reasons set forth with regard to the other embodiments.

Compounding of magnets is possible here too by providing magnets 74 having relative polarities as shown in FIG. 12.

Any conventional means may be used to join the concentric laminations forming the semi-circular sectors 62, rivets 76 being shown as one possible way of accomplishing this.

Figure 15:
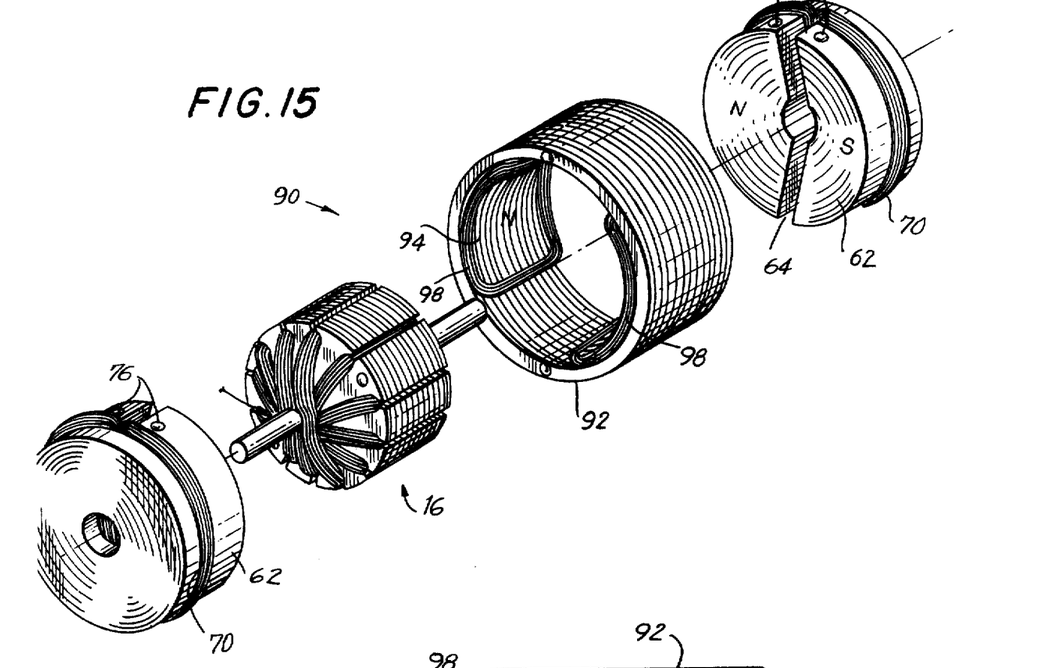
FIG. 15 is an exploded view, in perspective, of yet a further embodiment of the present invention.
Figure 16:
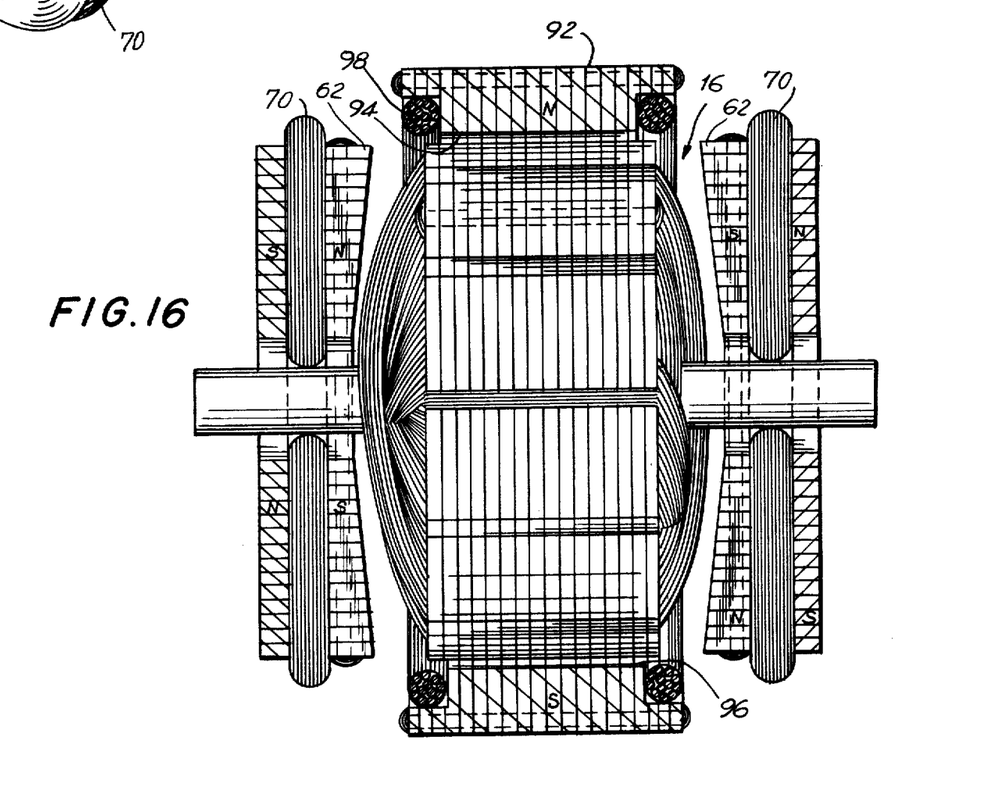
FIG. 16 is an enlarged cross-sectional view of the machine shown in FIG. 15, taken at a cutting plane which is essentially parallel to the axis of the machine.

A triple stator electromagnetic embodiment is shown in FIGS. 15 and 16 and generally designated by the reference numeral 90. As with the last mentioned embodiment, the machine 90 comprises two semi-circular magnetic sectors 62 at each axial end of the rotor 16, and a winding 70 extending about the peripheries of the sectors 62 in a plane substantially normal to the shaft 14 and forming a diametric air gap 64 proximate to the winding radial portions 18b, 18c. A cylindrical magnetic member 92 is provided which is generally coaxial with the shaft 14 and encloses the rotor 16 circumferential surface 16a. The magnetic member 92 has pole sections 94, 96 projecting radially inwardly into proximity to the rotor 16, circumferential surface 16a. Windings 98 are provided which extend about each of the pole sections 94, 96 as shown.

The machine 90, therefore employs one conventional two-pole stator positioned at the perimeter surface of the armature and dual two-pole disc stators previously described in connection with embodiments 11 and 12. Accordingly, the arrangement of the machine 90 provide a total of 6 stator coils, two of these coils each producing one of the stator fields. Again, as with the other embodiments, the three stators surround the armature to permit interaction with the armature coils on all surfaces. This design will provide the greatest torque power (or voltage induction for generator action). In this embodimwent, all three stators simultaneously interact with all armature coil surfaces and combine to produce the greatest amount of torque. It may be additionally noted in connection with this embodiment that when used with D.C. current only, it will permit combination use of permanent and electromagnets, i.e., perimeter electromagnets and axial side or end permanent magnets, or vice versa.

Figure 16A:
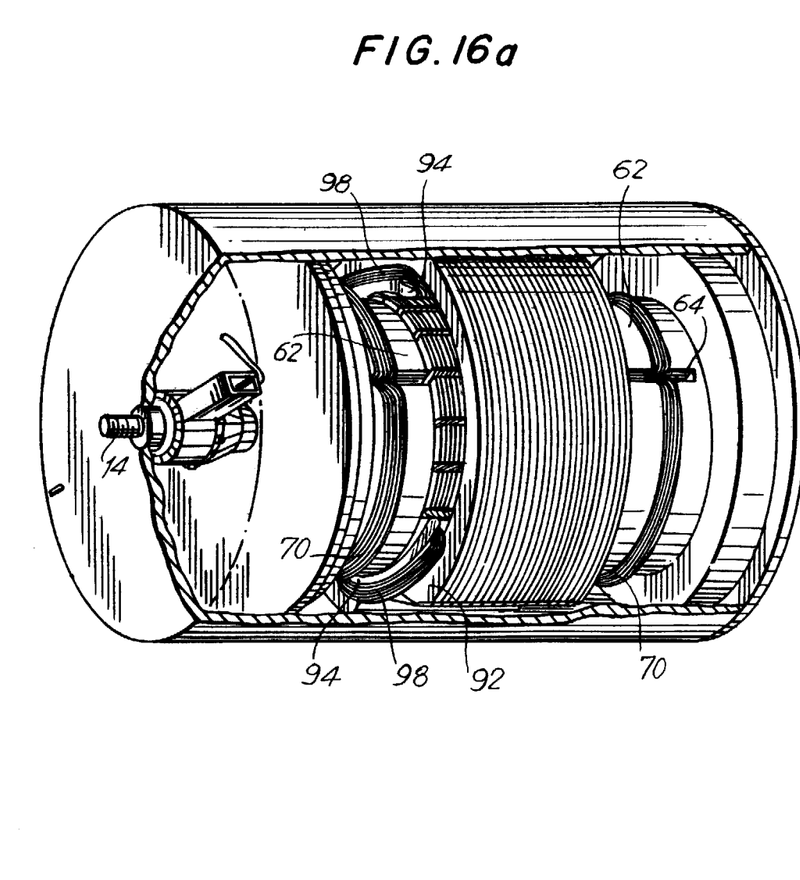
FIG. 16a is a perspective view of the assembled machine shown in FIGS. 15 and 16.

The disc stators shown in FIGS. 15, 16 and 16a may be constructed in the same manner as previously described for the dual stator embodiment, except, of course, for the provision of the pole extensions 66. Concave inner surfaces on the semi-circular sectors are provided for the same reasons previously described. These stators can also be constructed of one continuous band coiled to create a laminated core of desired diameter, as previously suggested. A properly sized hole may be drilled through the center close to the inner surface to accomodate the size an specified number of turns of wire. A slot is then cut along the length of the drilled hole to form the poles and permit insertion of the coils. The back or outer side remains whole and uncut and comprises a yoke for linkage of both outer poles as discussed in connection with FIG. 12.

Figure 17:
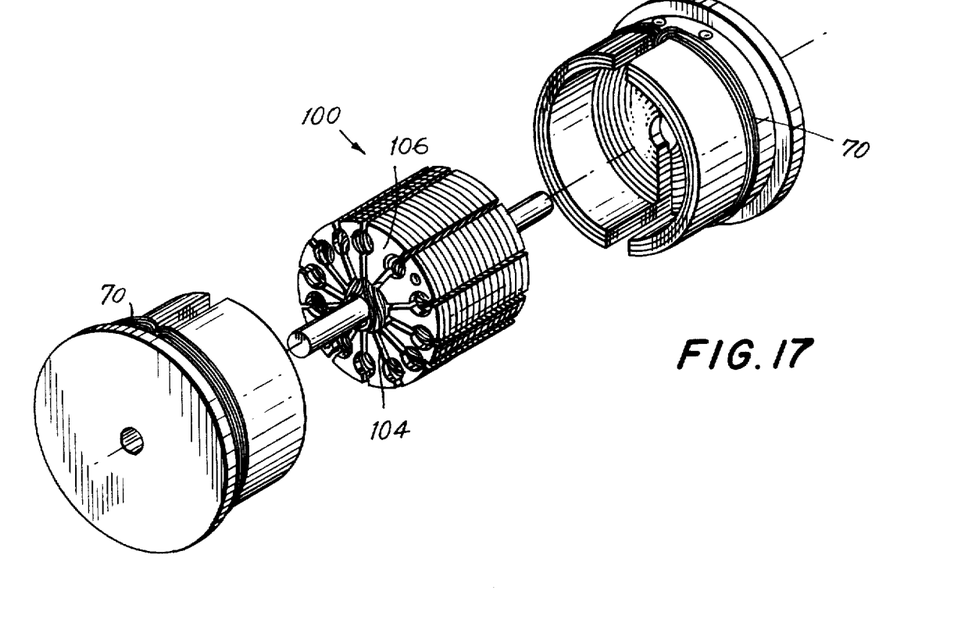
FIG. 17 is similar to FIG. 15, but shows yet an additional embodiment in accordance with the present invention.
Figure 18:
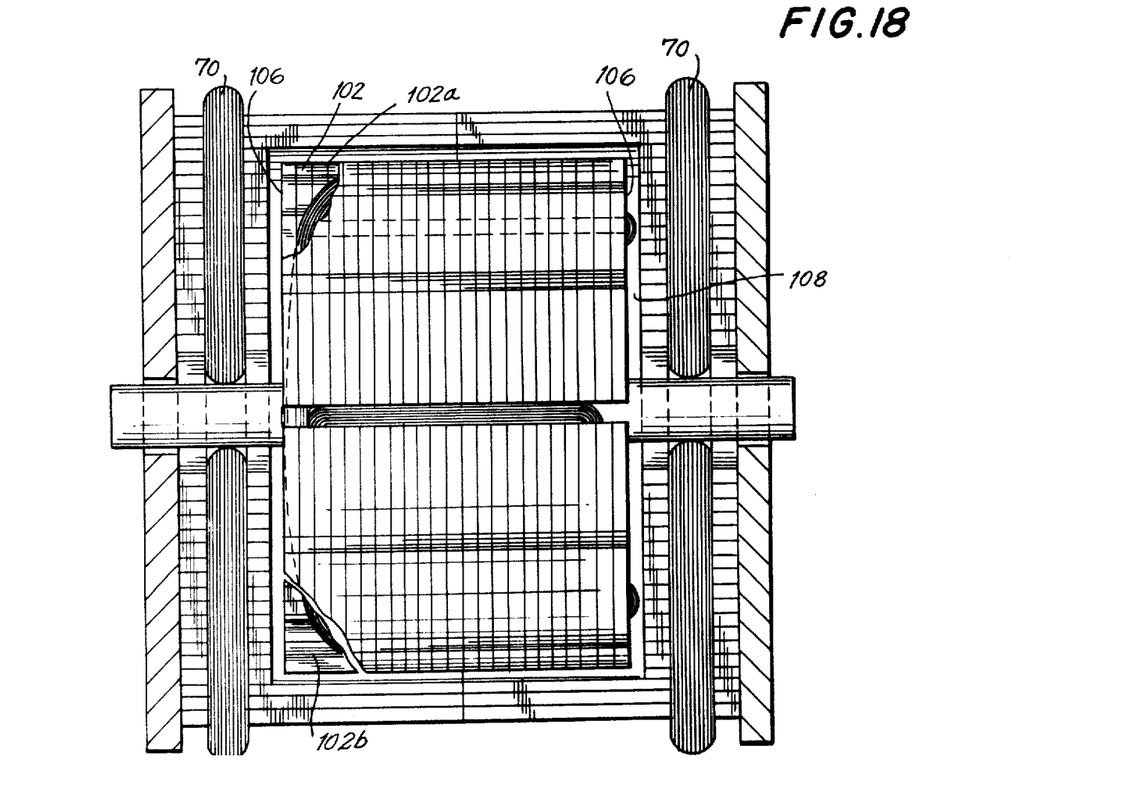
FIG. 18 is similar to FIG. 16 but illustrates a cross-sectional view of the embodiment shown in FIG. 17.

While most dynamoelectric machines which are provided with cylindrical rotors and distributed armature windings on said rotors will almost of necessity result in a build-up of overlapping windings at the axial end surfaces of the rotor, FIGS. 17 and 18 illustrate a modification of all of the previous embodiments which seeks to compensate for that build-up 26 in a manner other than providing complementary concave surfaces on the facing stator surfaces. In the last embodiment to be described, which is generally identified by the reference numeral 100 in FIGS. 17 and 18, the winding radial portions 18b and 18c at each axial end surface of the rotor 16 create a build-up 26 of overlapping windings as previously discussed. However, while such build-up generally defines a conical convex surface, the modified embodiment 100 includes magnetic projections 102 extending axially from each end surface 16b and 16c of the rotor 16 as shown. The axial projections 102 are configured to extend beyond the axially outermost points of the build-ups 26 and form protective slots 104 for the winding radial portions 18b, 18c and further form a substantially flat surface 106 at each axial end of the rotor 16. In this manner, the rotor 16 can be received with a frame 12 having a cylindrical cavity 108, the radial as well as axial air gaps now being capable of being minimized without danger of damage to the winding radial portions 18b, 18c.

The construction of the projections 102 is not critical as long as these projections are made of a magnetic material. Thus, as shown in FIG. 17 and the top of FIG. 18, the rotor 16 and the projections 102a may be formed of stacked laminations disposed in planes normal to the shaft. However as suggested at the bottom of FIG. 18, the rotor 16 may be formed of stacked laminations disposed in planes normal to the shaft 14, while the projections 102b are formed of stacked concentric laminations which are coaxial with the shaft 14 or spiral. The two different constructions have varying degrees of advantage, and the one used must be selected on the basis of the application intended. What should be pointed out is that the addition of the projections 102 essentially decrease the reluctance at the axial air gaps, therefore enhancing the field in those air gaps. The use of such additional metal to surround the build-up 26 results in increased coupling to such connection or radial portions 18b, 18c with increased efficiency of the overall machine.

While the machine 100 shown in FIGS. 17 and 18, using the modified rotor described, has been shown used with the semi-circular sectors 62 and semi-cylindrical projections 66 of the type shown in FIGS. 11 and 12, it should be clear that this modified rotor can be used in connection with any of the aforementioned embodiments in which case the end stators need not be provided with the modified complementary concave surfaces shown in the various figures. Whichever the embodiment used, once the modified rotor of FIGS. 17 and 18 is used, the stator can be configured to provide a perfectly cylindrical cavity in which the various operating air gaps can be minimized without danger of damage to the armature windings.

While all of the embodiments have been described with reference to generally D.C. machines, motor or generator, it should be clear that the modifications of the present invention can equally be used in connection with A.C. machines. However, in that case, one may not be able to utilize compounding of magnets since, in those cases, the electromagnets will constantly change polarities and, of course, the permanent magnets cannot do so. Therefore, the compounding of magnets is primarily limited to D.C. motor/generator uses and cannot be used in universal motor applications. In this connection, it should also be pointed out that all electromagnetic stator embodiments may be used in repulsion type motors in lieu of the conventional two-pole perimeter-only type.

While only a few illustrative embodiments of the invention have been described in detail, it should be obvious that there are numerous variations and modifications within the scope of the invention. The invention is more particularly defined the appended claims.

What is claimed:

1. A dynamoelectric machine comprising:

a frame;

a rotatable shaft supported by said frame;

a cylindrical rotor mounted coaxially on said shaft, said cylindrical rotor defining two axial end surfaces each substantially in a plane normal to said shaft and a cylindrical circumferential surface coaxial with said shaft between said axial end surfaces, said rotor being provided with a plurality of rotor coil winding grooves which are generally parallel to said shaft and substantially uniformly spaced from each other about said circumferential surface;

a distributed armature winding having axial portions parallel to said shaft and received within said rotor grooves and radial portions in the region of said end surfaces and extending between substantially diametrically opposite grooves with respect to said shaft; and magnetic field producing means mounted on said frame for producing a first magnetic field directed to interact with said winding axial portions and second magnetic fields, in the region of at least one axial end surface of said rotor, which are directed to interact with the respective winding radial portions, said winding radial portions at each axial end surface of said rotor creating a build-up of overlapping windings which is minimum at said circumferential surface and gradually increases to a maximum in the region of said shaft, said build-up generally defining a conical convex surface, and said magnetic field producing means being configured to generally conform to said circumferential and conical concave surfaces to thereby minimize the air gaps between said magnetic field producing means and said winding portions and optimize the coupling between the magnetic fields of said windings.

2. A machine as defined in claim 1, wherein said frame is cylindrical and generally conforms to the shape of said rotor, and wherein said magnetic field producing means comprises magnets mounted on said frame and disposed proximate to said circumferential portion to produce said first magnetic field, said frame having end portions each defining a generally concave surface which conforms to said conical convex surface defined by said windings, said field-producing means further comprising magnets mounted on said concave surfaces defined by said end portions proximate to said winding radial portions to produce said second magnetic fields.

3. A machine as defined in claim 2, wherein said magnets are permanent magnets.

4. A machine as defined in claim 2, wherein at least one of said magnets is a permanent magnet.

5. A machine as defined in claim 2, wherein at least one of said magnets are electromagnets.

6. A machine as defined in claim 1, wherein said magnetic field producing means comprises two opposing generally U-shaped magnetic cup members disposed on diametrically opposite sides of said rotor to substantially surround the same, each cup member having a longitudinal portion generally conforming to the shape of said rotor circumferential portion and transverse portions at each end of said longitudinal portion, said transverse portions extending from said longitudinal portions to the region of said shaft, the corresponding transverse portions on the opposing cup members forming air gaps therebetween proximate to said winding axial portions, and a winding extending about each cup member and disposed between the radially outermost and innermost surfaces thereof.

7. A machine as defined in claim 6, wherein each cup member winding extends about a respective longitudinal portion thereof and is generally parallel to said shaft.

8. A machine as defined in claim 7, wherein said windings on each cup member further extend along the outer peripheral surfaces of said transverse portions in a plane normal to said shaft, and further comprising yokes bridging said air gaps at and magnetically connecting the axially outermost surfaces of said transverse portions.

9. A machine as defined in claim 8, further comprising a cylindrical yoke coaxial with said shaft and enclosing said cup members while magnetically connecting the radially outermost surfaces of said longitudinal portions.

10. A machine as defined in claim 9, further comprising yoke members each magnetically connecting the axially outermost surfaces of associated transverse portions thereby bridging the respective air gaps at said surfaces.

11. A machine as defined in claim 10, wherein said cup members and yokes are formed of laminations disposed in planes parallel to said shaft.

12. A machine as defined in claim 8, further comprising permanent magnets arranged on the axially outermost surfaces of said transverse portions and arranged to enhance said second magnetic fields.

13. A machine as defined in claim 6, further comprising a cylindrical yoke coaxial with said shaft and enclosing said cup members while magnetically connecting the radially outermost surfaces of said longitudinal portions of said cup members.

14. A machine as defined in claim 13, wherein said cup members are formed of stacked laminations disposed in planes parallel to said shaft, while said yoke is formed of stacked laminations disposed in planes normal to said shaft.

15. A machine as defined in claim 1, wherein said magnetic field producing means comprises two semi-circular magnetic sectors at each axial end of said rotor, arranged to form a diametrical air gap proximate to said winding radial portions, each sector having associated therewith a semi-cylindrical projection dimensioned to cover in close proximity a portion of said rotor circumferential surface, said semi-cylindrical projections on associated sectors also forming longitudinal air gaps parallel to said shaft and proximate to said winding axial portions; and a winding extending about the peripheries of said sectors in a plane substantially normal to said shaft, whereby said windings create a field at said diametrical air gaps for coupling to said radial winding portions and at said longitudinal air gaps for coupling to said axial winding portions.

16. A machine as defined in claim 15, wherein said sectors are formed of concentric laminations coaxial with said shaft and slotted to provide said diametrical air gaps.

17. A machine as defined in claim 15, wherein said sectors are formed of a continuous spiral lamination slotted to provide said diametrical air gaps.

18. A machine as defined in claim 15, further comprising a yoke in the nature of a circular disc magnetically connecting the axially outermost surfaces of said magnetic sectors.

19. A machine as defined in claim 15, further comprising permanent magnets arranged on the radially outermost surfaces of said semi-cylindrical projections to enhance said magnetic fields.

20. A machine as defined in claim 19, further comprising a yoke in the nature of a circular disc magnetically connecting the axially outermost surfaces of said magnetic sectors.

21. A machine as defined in claim 15, wherein each winding which extends about a sector also extends along the periphery of the radially outer surface of an associated extension.

22. A machine as defined in claim 21, further comprising a cylindrical yoke coaxial with said shaft and magnetically connecting the radially outermost surfaces of said semi-cylindrical projections.

23. A machine as defined in claim 22, further comprising a cylindrical yoke coaxial with said shaft and magnetically connecting the radially outermost surfaces of said permanent magnets.

24. A machine as defined in claim 23, further comprising a yoke in the nature of a circular disc magnetically connecting the axially outermost surfaces of said magnetic sectors, and wherein said disc and cylindrical yokes associated with each set of sectors and associated projection are joined to each other to form a continuous yoke which encloses the respective set of sectors and associated projection.

25. A machine as defined in claim 21, further comprising a yoke in the nature of a circular disc magnetically connecting the axially outermost surfaces of said magnetic sectors.

26. A machine as defined in claim 1, wherein said magnetic producing means comprises two magnetic members at each axial end of said rotor, and a winding extending about the peripheries of said members in a plane normal to said shaft to form a diametric air gap proximate to said winding radial portions; and a cylindrical magnetic member coaxial with said shaft and enclosing said rotor circumferential surface, said magnetic member having pole sections projecting radially inwardly into proximity to said rotor circumferential surface; and windings extending about each of said pole sections.

27. A machine as defined in claim 26, wherein said magnetic members comprise semi-circular sectors formed of concentric laminations coaxial with said shaft and slotted to provide said diametrical air gaps.

28. A machine as defined in claim 26, wherein said magnetic members comprise semi-circular sectors formed of a continuous spiral lamination slotted to provide said diametrical air gaps.

29. Machine as defined in claim 1, wherein said winding radial portions at each axial end surface of said rotor create a build-up of overlapping windings which is minimum at said circumferential surface and gradually increases to a maximum in the region of said shaft, said build-up generally defining a conical convex surface, and further including projections extending axially from said end surfaces of said rotor, said axial projections being configurated to extend beyond the axially outermost points of said build-ups and forming protective slots for said winding radial portions and further forming a substantailly flat surface at each axial end of said rotor, whereby said rotor can be received within said frame having a cylindrical cavity and the air gaps between said magnetic field producing means and rotor can be minimized without danger of damage to said winding radial portions.

30. A machine as defined in claim 29, wherein said rotor and said projections are formed of stacked laminations disposed in planes normal to said shaft.

31. A machine as defined in claim 29, wherein said rotor is formed of stacked laminations disposed in planes normal to said shaft, and said projections are formed of stacked concentric laminations which are coaxial with said shaft.

32. A machine as defined in claim 1, wherein said field producing means is provided at both axial end surfaces of said rotor.

* * * * *